June 9, 1964  R. S. WALTON  3,136,116
VARIABLE REGULATOR
Filed Nov. 27, 1961

INVENTOR
Richard S. Walton,

BY Diggins + LeBlanc
ATTORNEYS

3,136,116
VARIABLE REGULATOR
Richard S. Walton, Willow Street, Pa., assignor to Hamilton Watch Company, Lancaster, Pa., a corporation of Pennsylvania
Filed Nov. 27, 1961, Ser. No. 155,131
10 Claims. (Cl. 58—109)

This invention relates to an arrangement for changing the rate of timepieces and more particularly relates to a variable regulator for changing the rate of timepieces controlled by a balance and hairspring by effectively lenthening or shortening the hairspring.

In a hairspring and balance wheel regulated timepiece, the period of the balance wheel is ordinarily adjusted by altering the overall stiffness of the effective portion of the hairspring. The usual method is to fix the outer coil at some point just beyond the stud pin by means of regulator or curb pins engaging the spring on both sides thereof. Thus, when regulation is to be accomplished, the pins are moved longitudinally along the spring to a new position. Obviously, for the timekeeping escapement to operate properly and have the right period, the positioning of these regulator or curb pins must be extremely accurate.

Prior known regulating mechanisms or timekeeping escapements have used various arrangements for adjusting the position of the regulator or curb pins. However, no particular solution has been found for correctly positioning these pins without the use of an elaborate and costly mechanism which not only increases the cost of the finished watch but requires that the watch repairman have special tools for their adjustment.

According to the present invention, it has now been found that a variable regulator may be constructed which can be produced at a low cost, is easily adjusted by a watch repairman without special tools and, more important, will allow the regulator or curb pins to be more accurately positioned than heretofore possible. This new and novel variable regulator works on the principle of different pivot points providing different amounts of linear translation for the same angular rotation; and on the principle that members describing different arcs and working together will provide linear translation.

Accordingly, the principal object of this invention is to provide a variable regulator arrangement which will allow the period of a balance wheel to be accurately adjusted.

Another object of this invention is to provide a variable regulator arrangement which may be economically produced and requires no special tools for its adjustment.

Yet another object of this invention is to provide a variable regulator mechanism which has a minimum number of parts so arranged as to occupy minimum space.

Still another object of this invention is to provide a variable regulator mechanism which cooperates with a coil spring for adjusting the overall stiffness of the spring without damaging or changing its characteristics.

These and further objects and advantages of the invention will become more apparent upon reference to the following description and claims, and the appended drawings wherein:

The same reference numerals denote the same parts throughout the several views of the drawings.

In the following description, the invention will be illustrated as applied to the customary flat hairspring, although it will become apparent that the same is adaptable to other forms of hairsprings capable of being adjusted by a pair of regulator or curb pins or their equivalent on both faces of a coil. Moreover, the invention is not to be regarded as limited in its application to a hairspring associated with a lever escapement or to a hairspring for a timepiece since other interval-measuring organizations may utilize a hairspring or its equivalent and the same may be embodied in timers not strictly classified as a watch or clock.

Figure 1:
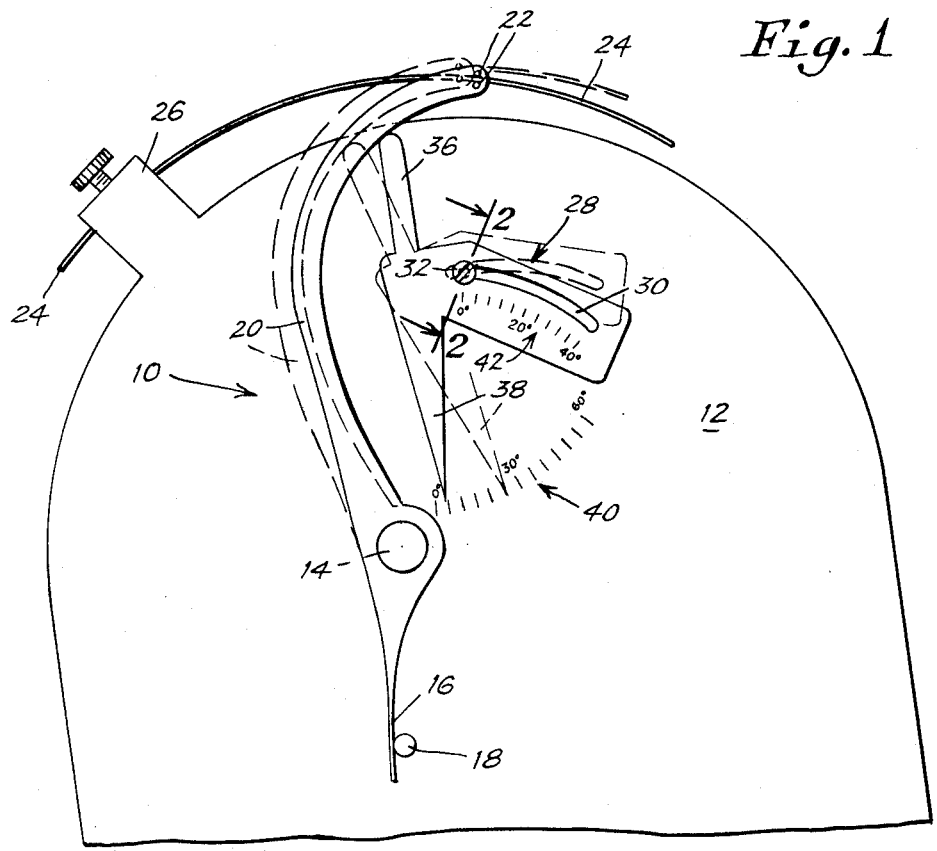
FIGURE 1 shows a front elevation of the variable regulator arrangement.

With reference to FIGURE 1, a regulator arm, indicated generally at 10, is shown to be pivotally mounted on a balance cock 12 by means of a pin or bolt 14 which is located at the center of both the regulator and hairspring. Forming an integral part of the regulator arm 10 is a thin spring section 16 which bears against a load pin 18 near its extreme end. This thin spring section and load pin arrangement serves to bias the regulator arm against movement in a counterclockwise direction about the pin 14. Obviously, other types of biasing or spring arrangements would serve to bias the regulator arm equally well although they would, in all likelihood, be more expensive and difficult to construct.

The upper portion 20 of the regulator arm is curved and has a pair of regulator or curb pins 22 mounted on its end. A balance spring (which has been partially omitted for clarity) is shown with its outermost convolution 24 interposed between the regulator pins. The spring is shown fixed to the balance cock 12 by a stud 26 in the usual manner.

Figure 2:
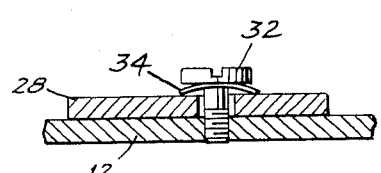
FIGURE 2 is a view of the regulator taken along line 2—2 of FIGURE 1.

Bearing against the inner surface of the curved portion 20 of the regulator arm 10 is a regulator plate which is indicated generally at 28. This regulator plate has an elongated curved regulator slot 30 and is pivotally mounted upon the balance cock 12 by regulator pin 32, as is more clearly shown in FIGURE 2. Positioned between the head of the regulator plate pivot pin 22 and the regulator plate 28 is a beveled spring 34 which serves to bias the regulator against the balance cock 12.

The regulator plate has an extended portion 36 which bears against the curved inner surface of the regulator arm 20 at its extreme end. Also forming an integral part of the regulator plate is a pointer arm or tail 38 which cooperates with a scale, indicated generally at 40, that is engraved or mounted on the face of the balance cock. A second scale 42 is engraved or mounted upon the regulator plate 28 just under the regulator slot 30. This scale cooperates with the pivot pin 32 for indicating the degrees the regulator plate is moved along the slot as will be more fully explained hereinafter in relation to FIGURE 3.

The operation of the variable regulator so as to give both a rough and fine adjustment of the period of a balance wheel may be explained in substantially the following manner.

As explained hereinabove, the period of a balance wheel may be adjusted by altering the overall stiffness of the effective portion of the customary hairspring. This altering of the overall stiffness is accomplished by moving the regulator pins 22 along a limited portion of the hairspring. This movement of the regulator pins is obtained by moving the regulator plate 28 so that the point where the extended portion 36 touches the curved surface of the regulator arm 20 will move along the regulator arm 10. As this contact point 10 moves along the regulator arm, the regulator pin 22 describes an arc similar to that of the hairspring 24 since the regulator arm and hairspring have the same center 14. The regulator arm will follow the regulator plate because it is spring loaded against the plate by the spring section 16 and pin 18.

Figure 3:
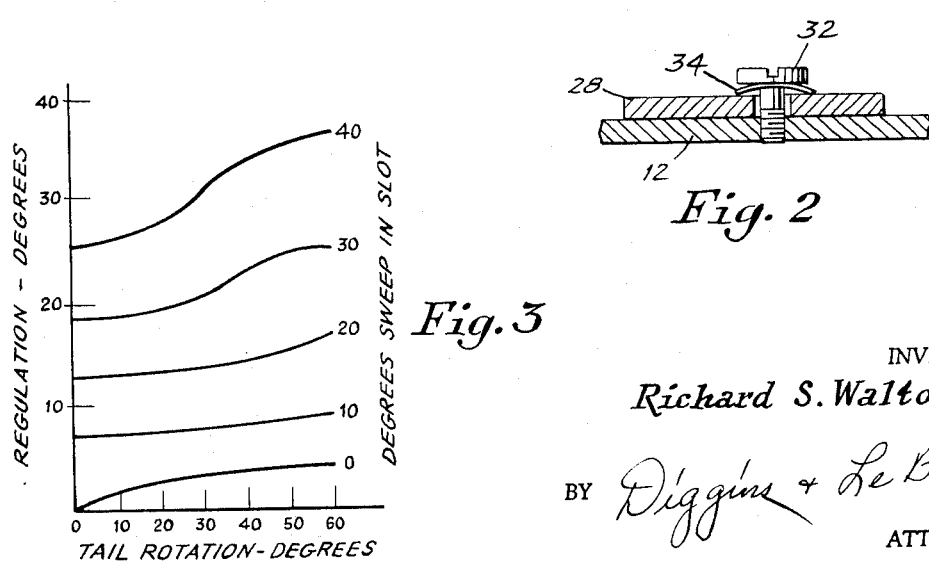
FIGURE 3 is a graph showing the change in the period of the balanced wheel with various settings of the regulator.

With this understanding of the overall adjustment of the variable regulator, it is readily seen how "rough" adjustment may be made in the period of a balance wheel. This rough adjustment is accomplished by loosening the pivot pin 32 slightly and rotating the regulator plate along the slot 30. As seen in the graph of FIGURE 3, the degrees sweep in the slot 30 will affect the overall period of the balance wheel by a known amount. By using this graph and the scale 42, rough adjustment of the time period is quickly obtained.

With the regulator plate positioned so as to give a rough adjustment, the variable regulator is now ready for a "fine" adjustment step. This fine regulation of the period of the balance wheel is obtained by rotating the regulator plate about the pivot pin 32. Since the pivot point of the regulator plate is now the pin 32 rather than point 14, a much greater angular movement of the plate is required to obtain the same amount of adjustment in the position of the regulator arm 20 thereby giving a fine adjustment effect.

The pressure exerted by the beveled spring 34 prevents the regulator plate 28 from accidentally slipping out of position during both the rough and fine regulating steps. Once the period of the balance wheel is properly adjusted, the pivot pin is tightened, thereby locking the regulator plate securely against the balance cock.

Since the pivot pin 32 is fixed in relation to the balance cock 12, fine regulation can be accomplished for any setting of the regulator plate 28 along the slot 30. The tail rotation and its affect upon the balance wheel is clearly shown by the graph of FIGURE 3.

Thus, it is seen that by using different pivot points, different amounts of movement for the same angular rotation may be transmitted through the regulator arm to the regulator pins thereby changing the period of the balance wheel. It has also been shown how the different arcs produced by using different pivot points can be worked together to provide linear translations.

It will be apparent from the foregoing that the variable regulator of this invention makes possible a more accurate adjustment of a balance wheel than has heretofore been possible. It will also be equally apparent that the regulator of the present invention may be adjusted without the use of special tools or test equipment. The overall design of the regulator arrangement requires a minimum amount of space and can be produced at a very low cost.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A variable regulator for a timekeeping device which includes a spring for oscillation of a balance wheel comprising, carrying means, regulator pin means carried by said carrying means, said regulator pin means being associated with said spring for altering the overall stiffness of the effective portion thereof, and movable means engaging said carrying means for moving said carrying means, said movable means being mounted for rotation and comprising a lever arm fulcrumed at the axis of said rotation and having a surface engaging said carrying means, said movable means being adjustably mounted so that the distance between the axis of said rotation and said surface is adjustable to provide rough and fine adjustment of said carrying means without disengaging said surface and said carrying means.

2. A variable regulator according to claim 1 wherein said movable means is a plate having an elongated slot with a pin located therein, said plate being movable in relation to and rotatable about said pin.

3. A variable regulator according to claim 2 wherein the carrying means is biased against said plate and said surface comprises a curvate cam surface engaging said plate.

4. A variable regulator for a timekeeping device which includes a coil spring for oscillating of a balance wheel comprising, a mounting surface, a regulator arm pivotally mounted on said mounting surface, regulator pins carried on the end of said regulator arm and associated with said coil spring for altering the overall stiffness of the effective portion thereof, a plate having an elongated slot, a pin mounted in said slot for securing said plate to said mounting surface so that said plate bears against said regulator arm, said plate being movable in relation to and rotatable about said pin.

5. A variable regulator according to claim 4 wherein said regulator arm is provided with a spring biasing means for biasing said regulator arm against said plate.

6. A variable regulator according to claim 5 wherein the spring biasing means is a portion of the regulator arm.

7. A variable regulator according to claim 4 wherein said elongated slot is curved.

8. A variable regulator according to claim 7 wherein the center of said elongated curved slot and said coil spring are the same.

9. A variable regulator according to claim 4 wherein a plurality of scales are provided for accurately positioning said plate.

10. A variable regulator according to claim 4 wherein said pin is provided with a spring for biasing said plate into frictional engagement with said mounting surface.

References Cited in the file of this patent
UNITED STATES PATENTS

| | | |
|---|---|---|
| 100,246 | Allen et al. | Mar. 1, 1870 |
| 824,466 | Brun | June 26, 1906 |
| 861,884 | Ohlson | July 30, 1907 |
| 2,789,414 | Andrews | Apr. 23, 1957 |

FOREIGN PATENTS

| | | |
|---|---|---|
| 342,522 | Switzerland | Dec. 31, 1959 |